Dec. 23, 1958
FRANK G. CHRISTOWSKI
NOW BY CHANGE OF NAME
FRANK G. CHRISTIE
FISH STRINGER
Filed May 31, 1952
2,865,544
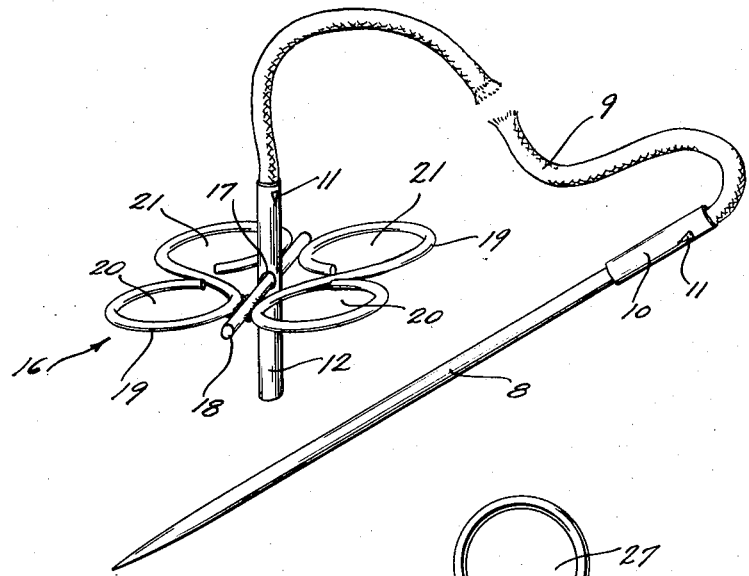
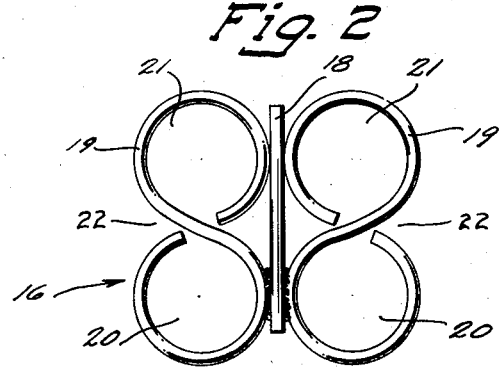
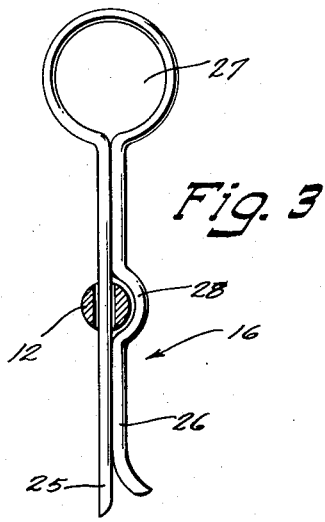
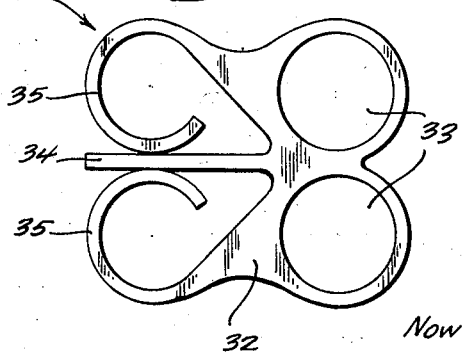
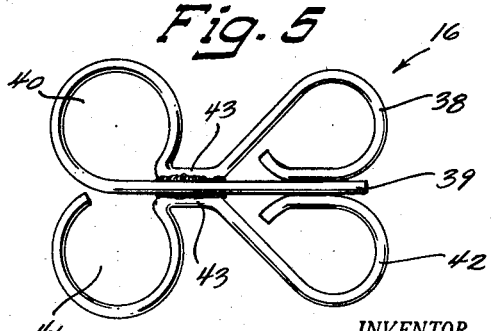
INVENTOR.
Frank G. Christowski
Now by change of name Frank G. Christie
Cyril M. Hajewski
Attorney

United States Patent Office

2,865,544
Patented Dec. 23, 1958

2,865,544

FISH STRINGER

Frank G. Christowski, Milwaukee, Wis.; now by change of name Frank G. Christie

Application May 31, 1952, Serial No. 290,920

1 Claim. (Cl. 224—7)

This invention relates generally to fish stringers and more particularly to an improved arrangement for retaining the fish on the stringer.

It is a general object of the present invention to provide an improved fish stringer, which will effectively retain the fish but will permit rapid and convenient removal of the fish when desired.

Another object of the present invention is to provide an improved retainer at the end of the fish stringer for retaining the fish on the stringer.

Another object of the invention is to provide a fish stringer with an improved retainer which may be readily removed when desired, to permit the fish to drop off of the stringer.

Another object of the invention is to provide an improved removable retainer for a fish stringer with integral grasping means which may be firmly gripped even though the retainer is covered with slime.

Another object is to provide an improved fish stringer having a retainer for retaining the fish on the stringer which may be also utilized as a reel for winding the string about it, so that the stringer may be conveniently stored.

Another object is to provide an improved fish stringer having a retainer for retaining the fish on the stringer which will not enter the gill of the fish but will lie flat against the body of the fish outside of the gill.

A further object is to provide an improved fish stringer having a removable retainer for retaining the fish on the stringer which is not subject to accidental removal while in ordinary use.

A further object is to provide a sturdy and efficient fish stringer of simple and inexpensive construction.

According to this invention a fish stringer is provided with an improved retainer for preventing the fish from dropping off of the stringer. The fish stringer includes the usual needle fixed to one end for threading the fish onto the stringer. The opposite end of the stringer however, is provided with a fastening bar or cartridge permanently secured to the string and having a transverse hole formed at approximately its central portion for receiving a pin of the removable retainer. The retainer comprises a pair of springs, one being secured to either side of the pin for the purpose of locking the retainer on the fastening bar by bearing upon the fastening bar when the pin is being withdrawn, but yielding to pass over the bar when sufficient force is exerted. The force necessary to remove the retainer against the spring pressure is sufficient to prevent its accidental removal while in use. The retainer is designed to lie flat against the body of the first fish on the stringer without entering its gills even though the stringer is threaded through the gills of the fish. Finger openings are provided on the retainer to facilitate grasping it, and when it is desired to remove the fish from the stringer the retainer is grasped with one hand and the fastening bar with the other. These two elements are thus pulled apart to remove the retainer from the fastening bar. After the retainer has been removed the fish may be easily dropped off the bottom of the stringer past the fastening bar which is of approximately the same diameter as the string so that it will not interfere with the passing of the fish over it. The configuration of the retainer is such as to provide indented portions about which the string may be conveniently wound so that the retainer will serve as a reel for the string to compact the assembly for easy storage in a fishing tackle box or the like.

The foregoing and other objects of the invention which will become more fully apparent from the following detailed description, may be achieved through embodiment of the invention in an apparatus such as the exemplifying devices depicted in and herein described in connection with the accompanying drawings, in which:

Figure 1 is a perspective view of a fish stringer constructed in accordance with the teachings of the present invention;

Figure 2 is an enlarged detail plan view of the retainer shown assembled to the fish stringer in Figure 1;

Figure 3 is a detail plan view showing an alternate construction of the retainer depicted in Figure 2;

Figure 4 is a detail plan view illustrating another modified form of the retainer shown in Figure 2; and Figure 5 is a detail plan view of a fourth modification of the retainer illustrated in Figure 2.

Referring now more particularly to the drawings, and specifically to Figure 1 thereof wherein is shown a fish stringer forming a practical embodiment of the present invention. The fish stringer there shown comprises a stringing needle 8 attached to one end of a string 9 by a cylindrical connector 10. The connector 10 is secured to the stringing needle 8 by brazing or any other suitable means which will firmly hold the connector 10 to the stringing needle 8.

The string 9 in turn, is attached to the other end of the connector 10 by inserting its end into the axial opening of the connector and bending inwardly a small triangular portion 11 of the connector 10. The apex or point of the triangular portion 11 is bent inwardly of the connector 10 to grip the string and prevent its being pulled out of the connector. To insure a firm grip of the string 9 two or more triangular portions 11 may be provided to secure the string to the connector 10.

The opposite end of the string 9 is provided with a fastening bar or cartridge 12 to which is removably attached a retainer generally denoted by the numeral 16, the retainer serving to retain the fish on the string 9, preventing them from falling off of the end past the bar 12. The fastening bar 12 is of approximately the same diameter as the string 9 and has a hollowed end for receiving the end of the string, which is retained therein by bent in triangular portions 11, in the same maner as it is secured to the connector 10.

A transverse hole 17 is formed in the bar 12 at approximately its central portion, the axis of the hole being substantially normal to the axis of the bar. The hole 17 is provided for receiving a pin 18 to attach the retainer 16 to the bar 12. The pin 18 is a part of the retainer 16, which includes two springs 19, each of which is in the form of the figure 8. As clearly shown in Figure 2 the retainer 16 is formed by placing the pin 18 between the two springs 19 tangent to the 4 circles comprising the figure 8's and securing the pin to the springs by brazing or welding at the lower circles 20. The upper circles 21 of the figure 8's, as shown in Figure 2, are not attached to the pin 18 but are resilient members which yieldably bear against the pin 18.

The retainer 16 is assembled to the bar 12 by inserting the pin 18 into the hole 17 of the bar 12 and forcing the bar past the circles 21 which will yield as pressure is applied. The bar 12 will then be attached to the pin 18 between the two pairs of circles 20 and 21 as shown in Figure 1, the springs 19 serving to prevent the bar 12 from becoming detached during normal use. When it is desired to remove the bar 12 from the retainer 16, two fingers of one hand may be conveniently placed within the circles 20 and the bar 12 may be grasped with the other hand. The bar 12 can then be pulled from the retainer 16 by exerting a force in a direction substantially parallel to the pin 18 and of sufficient strength to spread the circles 21 and permit the bar to pass. After the bar has been removed the springs 19 will return the circles 21 to their normal positions against the pin 18.

When separating the retainer 16 from the bar 12 it is important that the bar 12 be held to maintain the axis of the hole 17 in approximate alignment with the pin 18 to maintain the force on the bar substantially parallel to the pin and prevent binding of the bar 12 on the pin 18 at the hole 17. It will be noted that the hole 17 is approximately centrally disposed on the bar 12 so that a portion of the bar extends on either side of the retainer 16. This construction is important for the proper functioning of the device for two reasons. First, the portion extending above the retainer 16 serves to insure against accidental removal of the retainer while the stringer is in use, by reason of a fish applying pressure to the retainer against the string 9 while the latter is tied to a boat or other object. Any force applied to the bar 12 through the medium of the string 9 will tend to pivot the bar 12 about the pin 18. If such force is applied in the plane of the bar it will tend to pivot the bar 12 relative to the pin 18 and in doing so will cause the bar to bind on the pin at the hole to prevent its removal past the spring 19. Thus, this construction renders it susbtantially impossible for a fish to apply pressure in a direction parallel to the pin 18, which is necessary to remove the retainer 16 from the bar 12. Any such pull on the string 9 in any other plane, will of course, merely pivot the bar 12 about the pin 18 without any possibility of separating it from the pin.

The second reason that it is important for the hole 17 to be approximately centrally disposed on the bar 12 is to have a portion of it extending below the retainer 16. The fish stringer is used in the normal manner by threading the fish on the stringer through the needle 8. When placing the fish on the stringer, the retainer 16 is attached to the bar 12 for the purpose of retaining the fish on the string, it being of sufficient dimensions to preclude its entering the gill of the fish. The flat relatively large area of the retainer 16 serves very effectively to prevent its entering the gill of the fish, and being pivotable about the pin 18 it will adapt itself to lie flat against the body of the fish outside its gills. This makes the retainer always readily available for manipulating it in the manner described to remove it from the bar 12. Since the retainer 16 is designed to lie flat against the body of the fish, the portion of the bar 12 below the retainer will also remain outside of the fish so that it is always readily accessible and in full view.

Thus, when it is desired to remove the fish from the stringer, it is only necessary to grasp the portion of the bar 12 extending below the retainer and outside of the fish with one hand and insert two fingers of the other hand in the circles 20 and pull the retainer 16 from the bar 12. This can be accomplished without even touching the fish. After the retainer is removed the fish may be dropped off of the stringer past the fastening bar 12, eliminating the tedious procedure of removing the fish individually by passing them back up the stringer past the needle 8. Since the fastening bar 12 is of approximately the same diameter as the string 9 and offers no obstructions, it will readily permit the fish to pass over it without interference.

The double circle construction of the springs 19 shown in Figure 2 form V shaped recesses 22 at the sides of the retainer 16. These recesses may be advantageously utilized for the purpose of winding the string 9 about the retainer 16 when the stringer is not in use. Thus, the retainer serves as a reel for the string for convenient storage of the stringer in the tackle box, eliminating the possibility of the spring entangling with other items in the box.

Although the particular construction shown in Figure 2 for the retainer 16 has been found to be efficient and practical, other forms of construction may be used to advantage without detracting from the usefulness of the device. Thus, three different forms of construction are illustrated in Figures 3, 4, and 5.

The construction of Figure 3 is in the form of a large cotter key adapted to cooperate with the bar 12 to prevent the fish from dropping off of the stringer. It comprises a single piece of stock bent in half and shaped to provide a straight section 25 arranged to permit its entry into the hole 17 of the bar 12. Lying in juxtaposition to the section 25 is a spring section 26 which comprises the other half of the stock. The spring section 26 yieldably bears against the straight section 25, and these two portions are bent over in a manner to form a finger opening 27 at their closed end. To assemble the retainer 16 to the stringer, the straight section 25 is inserted in the hole 17 and the bar 12 is forced onto the section, causing the spring section 26 to be forced away from the section 25 to permit the bar 12 to be slid along the section 25 until it reaches a loop 28 formed in the spring section 26. The loop 28 is formed to provide clearance for the bar 12, which is retained in that location by the spring section 26 while the stringer is in use. The loop 28 is located at the central portion of the retainer so that the bar 12 will be locked at this position, to render the retainer effective for preventing the fish from dropping off of the stringer. To remove the bar 12, it is merely forced off of the section 25, causing the spring section 26 to move away from the section 25 until the bar 12 is removed.

The embodiment of Figure 4 is fabricated of a sheet metal stamping, and comprises a body 32 having a pair of holes 33 by means of which the retainer is grasped with two fingers. Extending from a position between the holes 33 is a pin 34 for receiving the bar 12 of the stringer. A pair of circular spring members 35 extend symmetrically from each side of the body 32 and coil towards its center into tangency with the pin 34 so that the pin is disposed between the two spring members 35 which normally bear against it. These spring members 35 are forced apart when either placing the bar 12 upon the pin 34 or removing it therefrom, the spring members yieldably retaining the bar 12 on the retainer 16. The sides of the body 32 are recessed as shown for the purpose of winding the string 9 about the retainer in the same manner as described for the retainer shown in Figure 2.

The construction illustrated in Figure 5 for the retainer 16 is quite similar to the construction of Figure 2 except that the spring members are not in the form of the figure 8. A continuous spring wire is shaped to form a spring 38 and a pin 39 with a finger opening 40. Another strand of spring wire is shaped to form another finger opening 41 and a spring 42. The finger openings and springs in both instances are joined by straight sections 43 which are welded or otherwise secured to the pin 39. The springs 38 and 42 are oppositely disposed on either side of the pin 39, and yieldably bear against the pin. The bar 12 is assembled to this retainer 16 in the same manner as described for the other constructions, being placed upon the pin 39, and forced onto it to spread the springs 38 and 42 which will serve to retain the bar on the pin during use until it is desired to remove it. The string 9 may be conveniently wound about the straight sections 43 for storage purposes.

From the foregoing detailed description of the several practical embodiments of the invention, it is apparent that there has been provided a useful and convenient fish stringer which is especially adaptable for permitting ready removal of the fish placed thereon.

Although specific forms of the invention have been described in detail in order to disclose clearly the features of the invention, it is understood that the particular apparatus shown and described are susceptible of various modifications that will be apparent to those skilled in the art without departing from the spirit and scope of the invention as defined in the subjoined claim.

The principles of the invention having now been fully explained in connection with the foregoing description of embodying structure, I hereby claim as my invention:

In a fish stringer, a string having a stringing needle attached to one end, a cartridge secured to the other end of said string, said cartridge having a hole formed in it at an angle to its axis, a retainer removably mounted on said cartridge by means of said hole, said retainer comprising a pin adapted for insertion into said hole, a plurality of springs secured to said pin at one end and arranged to yieldably interfere with the passage of said cartridge over the pin when the pin is inserted into or withdrawn from said hole, and a plurality of finger loops formed adjacent to said springs to facilitate grasping of the retainer, said finger loops and springs being formed to provide a recess between them about which the string may be wound so that the retainer may be used in the manner of a reel, whereby said springs serve to prevent accidental removal of said retainer from said cartridge while in use and adapt the retainer for use as a reel.

References Cited in the file of this patent

UNITED STATES PATENTS

| | | |
|---|---|---|
| 326,229 | Lowe | Sept. 15, 1885 |
| 927,840 | Dineen | July 13, 1909 |
| 1,341,722 | Putney | June 1, 1920 |
| 1,608,953 | Pflueger | Nov. 30, 1926 |
| 2,062,386 | Withey | Dec. 1, 1936 |
| 2,536,531 | Bishop | Jan. 2, 1951 |
| 2,599,057 | Jaralek | June 3, 1952 |

FOREIGN PATENTS

| | | |
|---|---|---|
| 578,109 | France | June 23, 1924 |